UNITED STATES PATENT OFFICE.

WILLIAM E. RIDENOUR, OF PHILADELPHIA, PENNSYLVANIA.

MANUFACTURE OF HYDRATED SODIUM CARBONATE.

No. 912,622.  Specification of Letters Patent.  Patented Feb. 16, 1909.

Application filed March 6, 1908. Serial No. 419,450.

*To all whom it may concern:*

Be it known that I, WILLIAM E. RIDENOUR, a citizen of the United States, residing in the city of Philadelphia, county of Philadelphia, and State of Pennsylvania, have invented certain Improvements in the Manufacture of Hydrated Sodium Carbonate, of which the following is a specification.

My invention consists in mixing with sodium carbonate, in practice in the form of soda ash, an amount of water sufficient for effecting the hydration desired without dissolving the sodium carbonate, with the production of an impalpable powder or amorphous product, different from the usual crystalline form of the compound.

In the manufacture of hydrated sodium carbonate as usually practiced, the soda ash is dissolved with the production of a hydrate, as the decahydrate, which is evaporated down at a definitely regulated temperature to produce the lower hydrates (as the monohydrate used in the trade as for scouring and in boiler compounds) which assumes crystalline form, less readily available for use and produced at considerably greater cost than the powder resulting from my process.

In the preferred practice of my process, for the production of monohydrated sodium carbonate, to five hundred pounds of soda ash of fifty-eight per cent. sodium oxid, in an operating mechanical mixer, there is gradually added one hundred and twenty-five pounds of water so that the water is evenly distributed throughout the entire mass, as an incident of which great heat is developed and a large quantity of steam is evolved. The mass is continuously stirred until cooled, when there will result a powdered product, assaying about fifteen and six-tenths per cent. of water, in which there is one molecule of water of crystallization combined with one molecule of sodium carbonate. The use of soda ash and water in the foregoing proportions gives the most uniform product, but it is possible to obtain a chemical union between other proportions of water and soda ash, as of fifty-eight or forty-eight per cent. sodium oxid, without dissolution and crystallization. To obtain a higher hydrated sodium carbonate, with five hundred pounds of soda ash of fifty-eight per cent. sodium oxid there should be uniformly mixed by constant stirring two hundred pounds of water and the stirring continued during the cooling of the product, high heat being generated and a large amount of steam evolved. This product will contain about twenty-three and four-tenths per cent. of water chemically combined with the sodium carbonate, or one and one-half molecules of water to each molecule of sodium carbonate. A chemical compound can be obtained from the use of a smaller amount of water but this true chemical compound can best be obtained by the use of the proportions specified.

It is to be understood that the use of the limited amount of water in the manner specified will produce the desired product directly, without boiling down or crystallization, while the use of an excess of water produces a solution requiring a carefully regulated evaporation with crystallization.

Chemical salts, as phosphate of soda, may be dissolved in the water used for the hydration of the sodium carbonate (soda ash 58% or 48%), or added to the sodium carbonate before hydration, thereby obtaining true chemical reaction in a quick and efficient manner, with the production of the desired product more economically than by the old method of dissolution and crystallization. Also the various tannin extracts, either with or without chemical salts, can be added to the water to be used or to the soda ash before hydration, thus giving colored products containing sodium carbonate, water of crystallization, tannin and chemical salt in combination.

These improvements have been found to effect a great saving in time, apparatus, fuel, workmen and space in manufacture, with the production of a more uniform product in a form more economically used and better suited to the trade than the crystalline form produced by the usual practice.

Having described my invention, I claim:

1. The process of manufacturing hydrated sodium carbonate which consists in intimately mixing definite proportions of water and sodium carbonate without dissolving the sodium carbonate, the water used being limited to an amount insufficient to effect the crystallization of the product.

2. The process of manufacturing hydrated sodium carbonate which consists in intimately mixing definite proportions of water and sodium carbonate without dissolving the sodium carbonate and stirring the mixture until it is cool, the proportion of water combined being insufficient to produce crystallization.

3. The process of manufacturing hydrated sodium carbonate which consists in intimately mixing together sodium carbonate and water in sufficient proportion to produce the hydrated sodium carbonate without dissolving the sodium carbonate, the amount of water being limited so as to produce a pulverulent product.

4. The process of manufacturing hydrated sodium carbonate which consists in intimately mixing together sodium carbonate in the form of soda ash and water, in the proportions of about five hundred pounds of soda ash to approximately one hundred and twenty to two hundred pounds of water, substantially as described.

In witness whereof I have hereunto set my name this fourth day of March, A. D. 1908, in the presence of the subscribing witnesses.

WILLIAM E. RIDENOUR.

Witnesses:
  Jos. G. Denny, Jr.,
  Charles N. Butler.